United States Patent
Kritt et al.

(10) Patent No.: US 9,203,951 B1
(45) Date of Patent: Dec. 1, 2015

(54) MOBILE TELEPHONE ADAPTED FOR USE WITH ONE HAND

(71) Applicant: International Business Machines Corporation, Armonk, NY (US)

(72) Inventors: Barry A. Kritt, Atlantic Beach, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/324,006

(22) Filed: Jul. 3, 2014

(51) Int. Cl.
| H04M 1/00 | (2006.01) |
| H04B 1/38 | (2015.01) |
| H04M 1/725 | (2006.01) |
| H04M 1/02 | (2006.01) |

(52) U.S. Cl.
CPC ........ H04M 1/72569 (2013.01); H04M 1/0281 (2013.01); H04M 1/72583 (2013.01)

(58) Field of Classification Search
None
See application file for complete search history.

(56) References Cited

U.S. PATENT DOCUMENTS

| 6,360,104 | B1 * | 3/2002 | Budd et al. ............... 455/566 |
| 7,880,247 | B2 | 2/2011 | Vaganov et al. |
| 2011/0087990 | A1 * | 4/2011 | Ng et al. ............... 715/773 |
| 2013/0113715 | A1 * | 5/2013 | Grant et al. ............... 345/173 |
| 2013/0155276 | A1 * | 6/2013 | Ueda ............... 348/223.1 |
| 2013/0176208 | A1 | 7/2013 | Tanaka et al. |
| 2013/0321265 | A1 | 12/2013 | Bychkov et al. |
| 2014/0015778 | A1 | 1/2014 | Taguchi et al. |
| 2014/0098032 | A1 * | 4/2014 | Ng et al. ............... 345/173 |
| 2014/0168135 | A1 * | 6/2014 | Saukko et al. ............... 345/174 |
| 2014/0195969 | A1 * | 7/2014 | Irvine ............... 715/810 |
| 2014/0245171 | A1 * | 8/2014 | Jaycobs et al. ............... 715/746 |

OTHER PUBLICATIONS

"Computer Access through eye gaze", Internet-published article of Tobii Technology, printed from http://www.tobii.com/en/assistive-technology/global/products/hardware/pceye/ on Jul. 4, 2014. 4 pages.

* cited by examiner

*Primary Examiner* — Dominic E Rego
(74) *Attorney, Agent, or Firm* — Marcia L. Doubet

(57) ABSTRACT

A mobile telephone is adapted for use with one hand. In one embodiment, the mobile phone comprises a pressure-sensitive detector situated along a side edge portion. An object of interest to the phone's user is detected (for example, using a gaze-point tracker) from among at least one object displayed on the display surface, and invocable operation(s) are determined for that object. A graphical representation of a respective one of the operations is positioned on the display screen in proximity of the current location of each contacting finger of the user, where each positioned graphical representation is operable to invoke the respective operation in response to the user indicating a selection (for example, by applying relatively more pressure thereto) of the positioned graphical representation.

18 Claims, 8 Drawing Sheets

MOBILE TELEPHONE ADAPTED FOR USE WITH ONE HAND

BACKGROUND OF THE INVENTION

The present invention relates to mobile telephones and computer programming, and deals more particularly with adapting a mobile telephone for use with one hand and to mobile telephones that are adapted in this manner.

Use of mobile telephones is becoming ubiquitous in today's world. Many such phones have a relatively large display area or "screen", and users typically interact with information on these screens using both hands: commonly, one hand is used for holding the phone and the other hand is used for interacting with the phone to perform various navigation functions, to select choices from menus, and so forth.

BRIEF SUMMARY OF THE INVENTION

The present invention is directed to adapting a mobile telephone for use with one hand, and to mobile telephones that are adapted in this manner. In one embodiment, a mobile phone comprises: a pressure-sensitive detector situated along a side edge portion of the mobile phone; a display surface; a processor; and instructions which are executable, using the processor, to perform functions. The functions preferably comprise: detecting, for a user of the mobile phone, an object of interest from among at least one object displayed on the display surface; determining, for the object of interest, each of at least one operation invocable for the object; determining, by the detector, a current location of each contacting finger of the user, the contacting fingers being in contact with a first side edge portion of the phone; and for each contacting finger, positioning a graphical representation of a respective one of the determined at least one invocable operation on the display screen in proximity of the current location of the contacting finger, each positioned graphical representation being operable to invoke the respective invocable operation in response to the user indicating a selection of the positioned graphical representation. Detecting the object of interest may be performed by a gaze tracker that detects eye movements of the user (such as detecting that the user blinks when looking at a particular displayed object).

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

DETAILED DESCRIPTION OF THE INVENTION

Embodiments of the present invention are directed toward adapting a mobile telephone for use with one hand, and to mobile telephones that are adapted in this manner. Use of a mobile phone which is adapted according to embodiment of the present invention may provide improved usability and improved user satisfaction due to this ease of use, among other benefits, as will be described.

Figure 1:
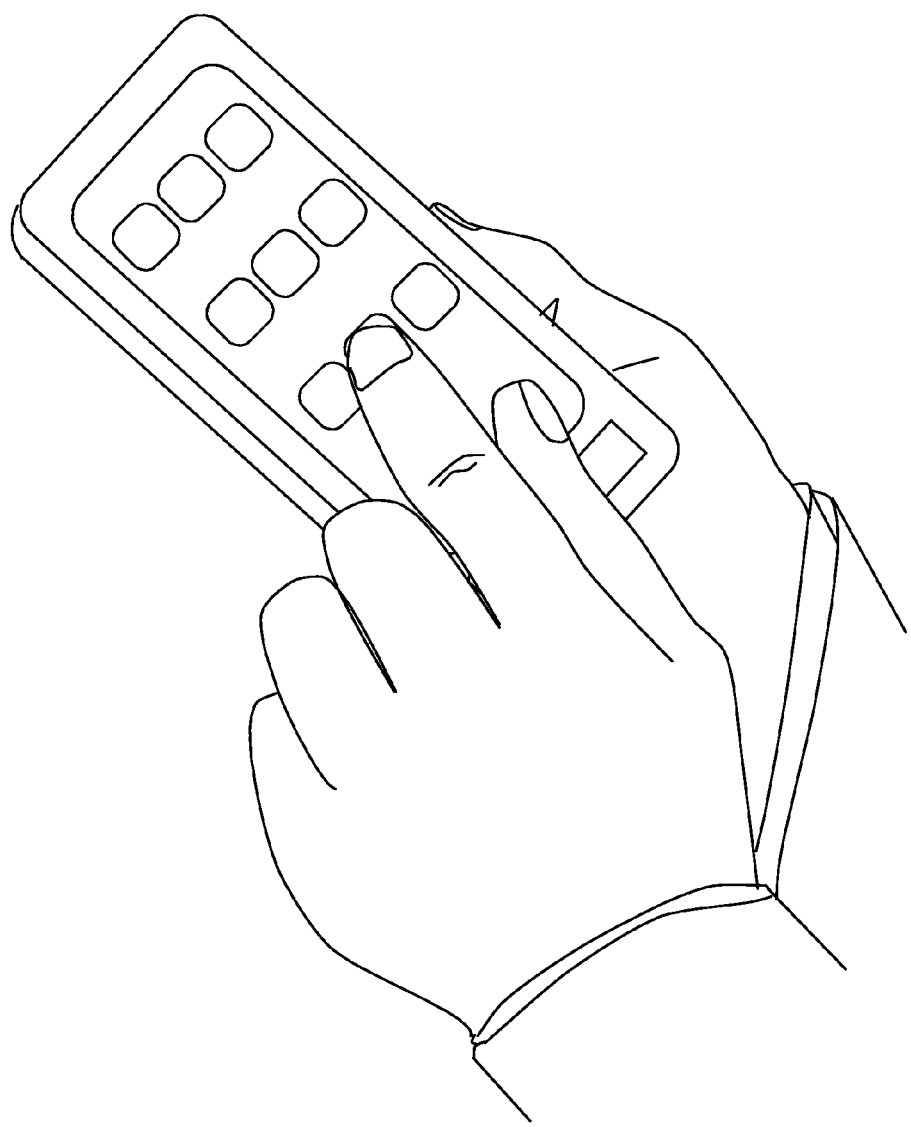
FIG. 1 illustrates a conventional manner of using a mobile phone, in which both hands are required.

FIG. 1 illustrates a conventional manner of using a mobile phone, in which both hands are required. One hand is shown as holding the phone, while the other hand is shown as performing an interaction with information displayed on the screen of the phone.

In some instances, using both hands for the phone may be rather difficult. One known solution is to use a phone of a smaller size, so that the device is less wieldy, which may also improve the user's ability to navigate around the smaller-sized screen. However, many users prefer to have phones with relatively larger screens, and in turn, this may make the phone difficult to operate without using both hands.

An embodiment of the present invention allows a user to interact with a phone while using only a single hand for both holding the phone and for interacting with the information displayed on the screen, as will now be discussed.

It is desired to know which of the displayed objects is the object with which the user wants to interact. A gaze-point tracker is leveraged in preferred embodiments, where this gaze-point tracker is adapted to deduce which area of the screen is the focus of the user's interest at a point in time by virtue of the user's gaze being directed to that area of the screen. Gaze-point tracking is known in the art, and an embodiment of the present invention preferably leverages an existing solution to provide this functionality. The gaze-point tracker may detect that the user's gaze is directed to a certain area of the screen, for example by measuring a period of time in which the user's gaze remains focused on the particular area of the screen.

Figure 2:
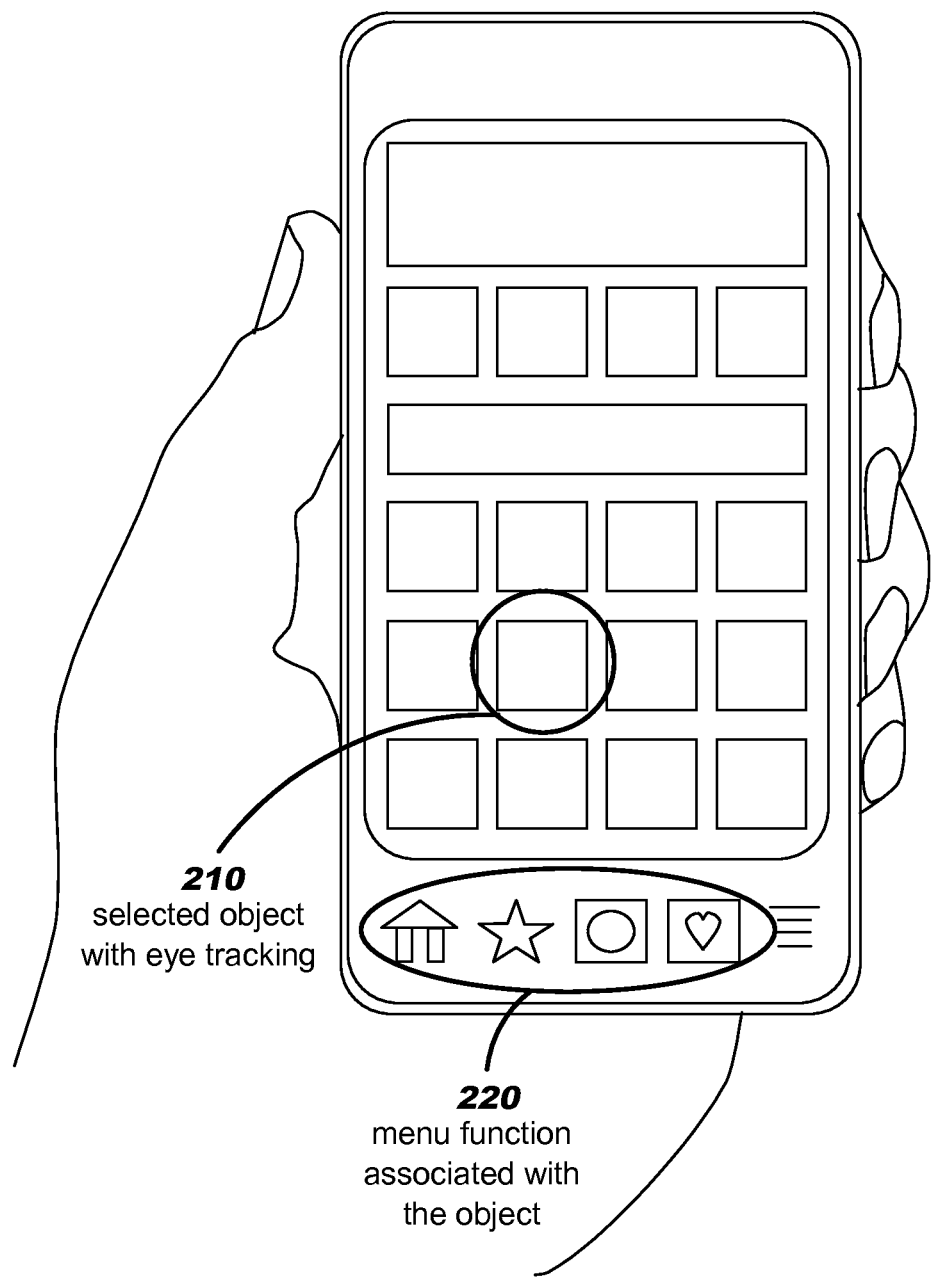
FIG. 2 illustrates use of a gaze-point tracker with a mobile phone.

See FIG. 2, which illustrates use of a gaze-point tracker. When using a conventional gaze-point tracker, an object which is determined to be the focus of the user's interest may be highlighted on the screen. See reference number 210, which indicates that a particular graphical object is highlighted. According to an embodiment of the present invention, the user preferably confirms his or her interest in the object which is identified by the gaze-point tracker. One manner of confirming is for the user to blink his or her eyes in response to seeing that the intended object has been highlighted. This may be interpreted as a signal that the user is interested in interacting with the graphical object which is presently displayed in the gazed-at area.

Once a particular object has been selected for interaction, operations which may be applied to that object are determined, and icons representing such operations (or a subset thereof) are commonly placed along the lower section of the screen. See reference number 220, where this is illustrated. Preferably, the operations are context-specific, in view of the selected object. The file type of the object may be used to determine such context-specific operations, using known techniques, and the operations may include (by way of illustration but not of limitation) various navigation or menu functions. For example, if the selected object has a file type of "JPG" or "JPEG", it may be concluded that is a photo, and icons may be displayed for allowing the user to perform context-sensitive operations that are determined to be useful for photo objects. The invocable operations may therefore allow the user to zoom in or out; begin a slideshow of photos; share the photo with others; delete the photo; rotate the photo; and so forth. When using known techniques for selecting an operation, the user is required to move his or her finger to this lower portion 220 of the screen in order to activate a desired one of the icons. Accordingly, it becomes cumbersome to attempt such interaction without using both hands.

In contrast to the known approach of requiring the user to move their finger to an icon in the lower portion 220 of the screen, an embodiment of the present invention effectively "moves" (or copies) the icons to the location of the user's fingers. Thus, the user can continue to hold the phone in one hand while simultaneously using the fingers of that hand to select from among the displayed icons. An embodiment of the present invention provides a pressure-sensitive mechanism along the boundary or side (also referred to herein as a "side edge portion") of the phone, and this mechanism detects the location of contact by the user's fingers (preferably, including the thumb) and also detects when the user applies pressure with a finger to thereby indicate a selection operation. The pressure-sensitive mechanism preferably detects, as the user's signal to select an operation, that one of the fingers is applying relatively more pressure than the other fingers.

Note that the pressure-sensitive mechanism is preferably provided in a symmetric manner on both side edge portions of the phone, such that the advantageous mobile phone interactions as disclosed herein are available to users who are right-handed as well as to users who are left-handed. (This may also improve usability of the mobile phone by allowing a single phone to be shared among users who are right-handed and left-handed.)

Figure 3:
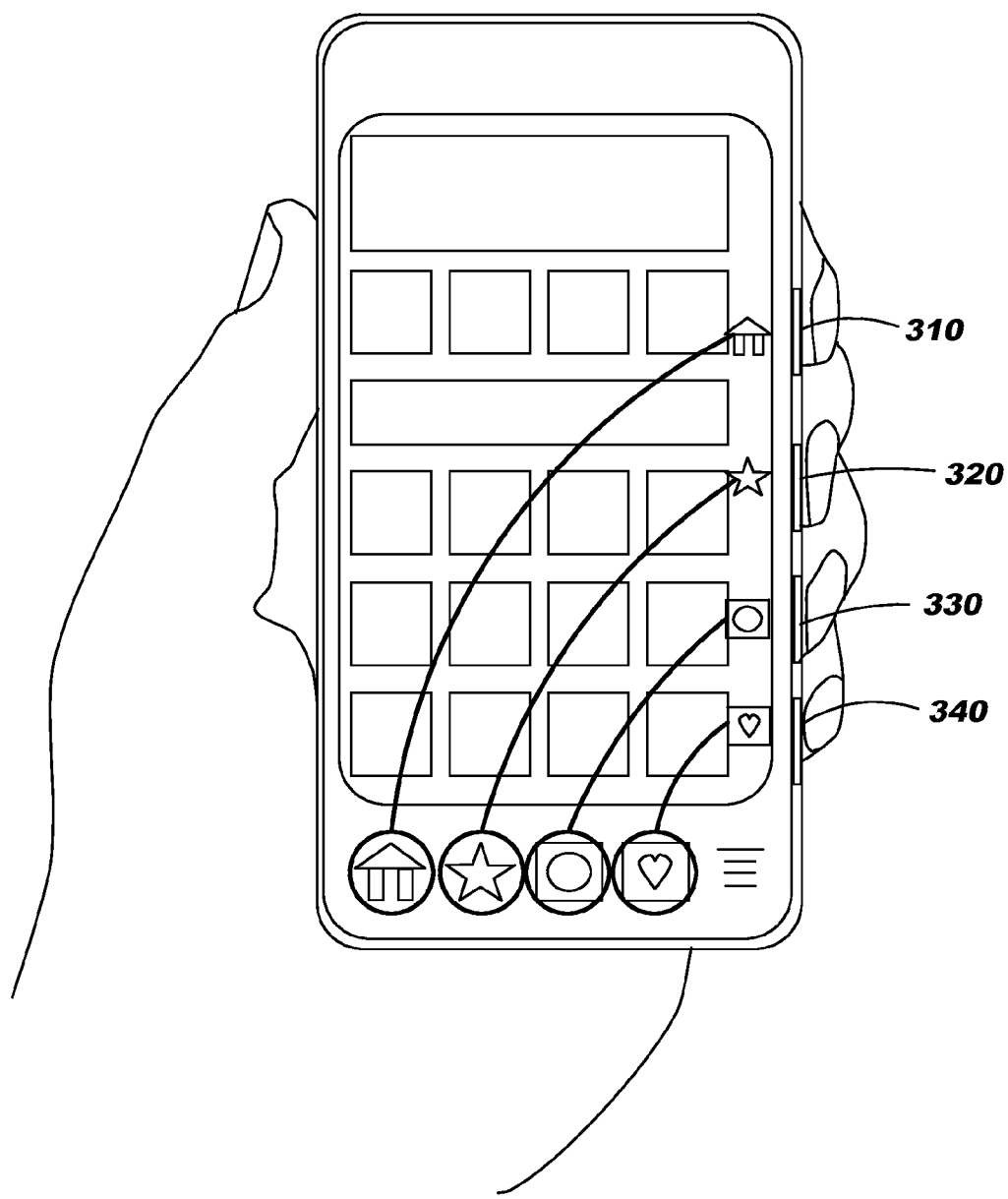
FIG. 3 illustrates 4 selectable iconic representations, or "shortcuts", which have each been placed at the location of one of the user's fingers to allow the user to select a corresponding operation.

See FIG. 3, where reference numbers 310, 320, 330, 340 indicate 4 selectable iconic representations, or "shortcuts", which have each been placed in proximity of the location of one of the user's fingers. (The term "shortcuts" is used herein to distinguish the iconic representations 310-340 from the conventional icons at 220.) The term "in proximity of the location", as used herein, refers to placing a shortcut on the display surface in a location which corresponds to the location of the user's finger along the side edge portion of the phone. Note, however, that the user is not required to place his or her finger on a shortcut to select it, but rather applies pressure to the side edge portion (as discussed with reference to FIG. 4, below). Note also that as illustrated in FIG. 3, each of the shortcuts 310-340 is a representation of a corresponding icon which is concurrently displayed in the lower portion 220 of the screen. The user may thereby apply pressure to the pressure-sensitive boundary of the phone to select one of the shortcuts 310-340, causing invocation of its corresponding operation, without having to move his or her fingers to the lower portion 220 of the screen.

As noted earlier, the pressure-sensitive mechanism preferably detects, as the user's signal to select an operation, that one of the fingers is applying relatively more pressure than the other fingers. See FIG. 4, where reference number 410 indicates that the user has applied more pressure with the finger where shortcut 320 is located, thereby signaling the selection of the corresponding operation.

Figure 4:
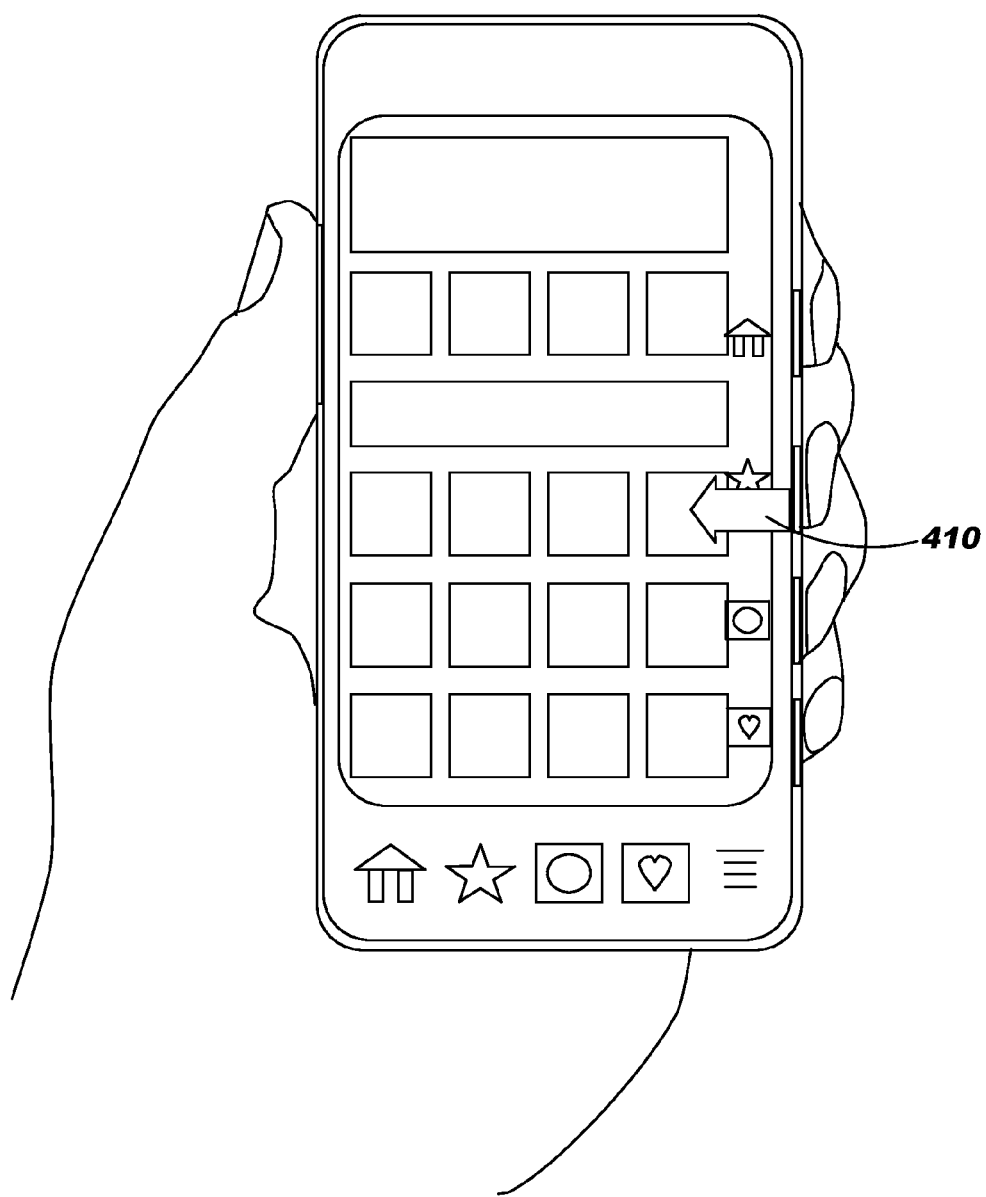
FIG. 4 illustrates a user signaling the selection of an operation by applying relatively more pressure with a finger where a desired shortcut is located.

The actual content displayed for each shortcut may vary without deviating from the scope of the present invention. In one approach, a miniaturized version of the corresponding icon from portion 220 of the screen may be displayed as the shortcut, as shown in FIG. 4. In another approach, icons from portion 220 may be shown as content within a predetermined graphical shape (such as a rectangle), where this graphical shape is common to each shortcut. As yet another approach, numerals may be displayed alongside each of the icons in the lower portion 220 of the screen, and the same numeral may then be shown at (or as) the corresponding shortcut.

Figure 5:
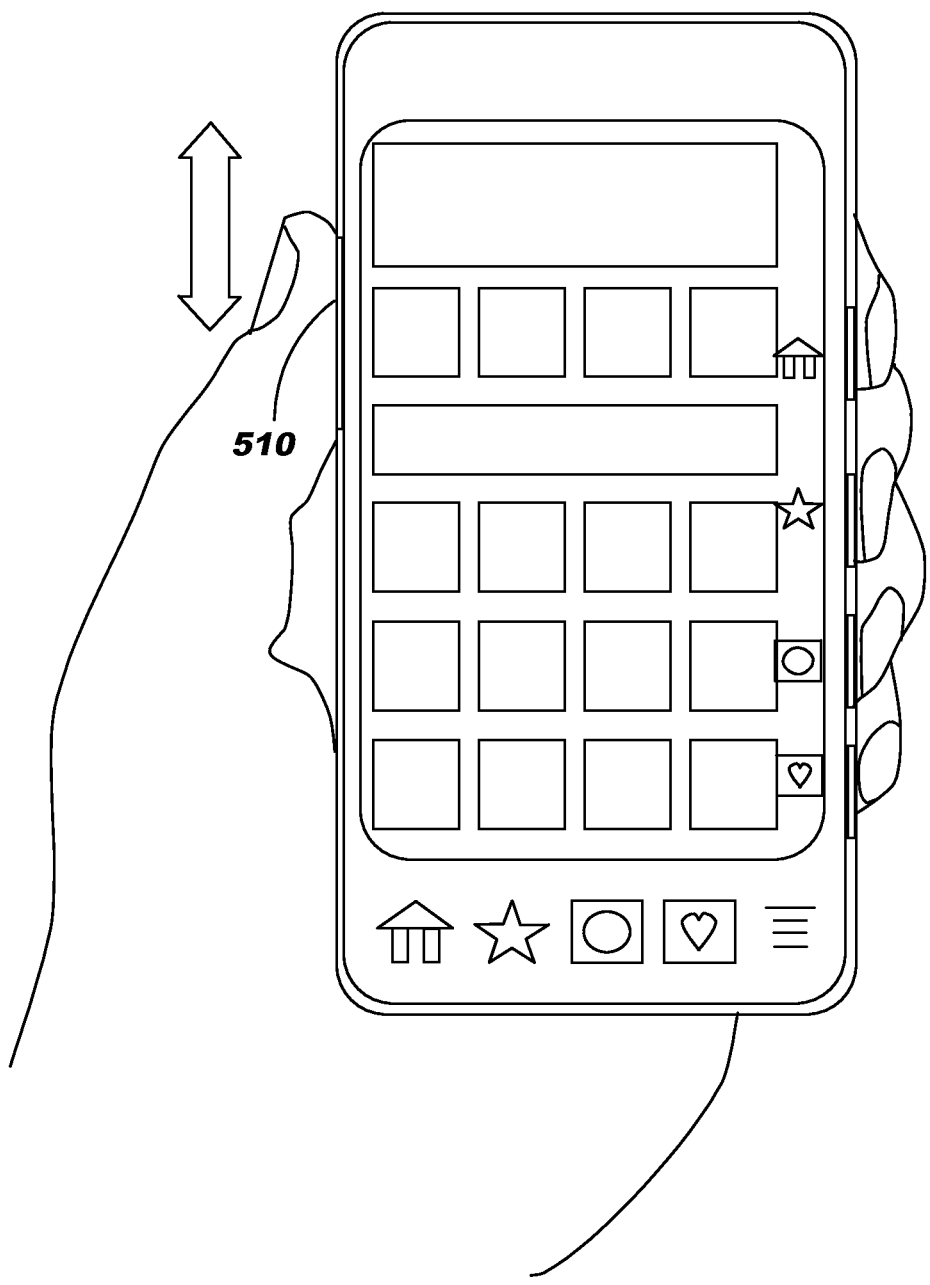
FIG. 5 illustrates a user moving their thumb up and down to scroll back and forth through available shortcuts, causing different ones of those shortcuts to be placed at the location of the user's fingers.

In preferred embodiments, the shortcuts are displayed in groups of 4, such that a different shortcut is provided for selection by each of the user's 4 fingers. In situations where more than 4 context-sensitive operations are available, an embodiment of the present invention preferably provides for scrolling among the shortcuts. In one embodiment, the scrolling may be provided responsive to detecting movement of the user's thumb. This is illustrated in FIG. 5, where reference number 510 indicates the user moving his or her thumb up and down to scroll back and forth through the available shortcuts. In response, a next (or previous) group of 4 shortcuts is preferably determined and the shortcuts in this group are placed in proximity of the location of the user's fingers.

In an optional aspect of the present invention, the context-sensitive operations to be presented in the groups of shortcuts may be ordered in view of the frequency of use, or predicted desirability of use, by this particular user. A history-gathering function may be leveraged which, for example, counts frequency of use of particular operations in association with particular types of displayed objects. For example, if the user of the phone most often selects a share operation after selecting a photo object from the screen, then the first shortcut within the first group of 4 shortcuts for photo objects is preferably an iconic representation of the share operation. (Note that when this option is implemented, the order of shortcuts as displayed at 310-340 may be different from the order of the icons in the lower portion 220 of the screen.)

In another optional aspect, the pressure-sensitive boundary detects movement in orthogonal directions. Notably, in addition to allowing the user to scroll among groups of shortcuts, it is typically necessary to provide a way for the user to scroll among the objects displayed on the screen. In one approach which leverages existing techniques, the user may activate the scrolling among displayed objects through eye movements which are detected by the gaze-point tracker. For example, the user may gaze to the edge of the display area to signal that the displayed objects should scroll sideways. When this optional aspect is implemented, however, the scrolling of the displayed objects may be signalled using the pressure-sensitive mechanism instead of (or as an alternative to) relying on the user to signal the gaze-point tracker by eye movements. Accordingly, an embodiment of the present invention may be adapted for allowing the user to signal scrolling among the displayed objects by moving his or her thumb along the pressure-sensitive boundary of the phone in a direction that is orthogonal to the direction used for scrolling among the groups of shortcuts. For example, when an embodiment of the present invention is adapted for associating an up or down movement of the user's thumb with scrolling among shortcuts, then a front-to-back movement of the user's thumb preferably invokes scrolling of the displayed objects from side to side across the screen.

In yet another optional aspect, rather than confirming selection of a displayed object by an eye movement (such as blinking) that is detected by the gaze-point tracker, as discussed above, the user may confirm the selection of the displayed object by using applying thumb pressure to the pressure-sensitive boundary of the phone. This type of explicit confirmation may be preferable, for example, when users do not want blinks of their eyes to be interpreted as signalling the confirmation of an object selected by the gaze-point tracker.

Figure 6:
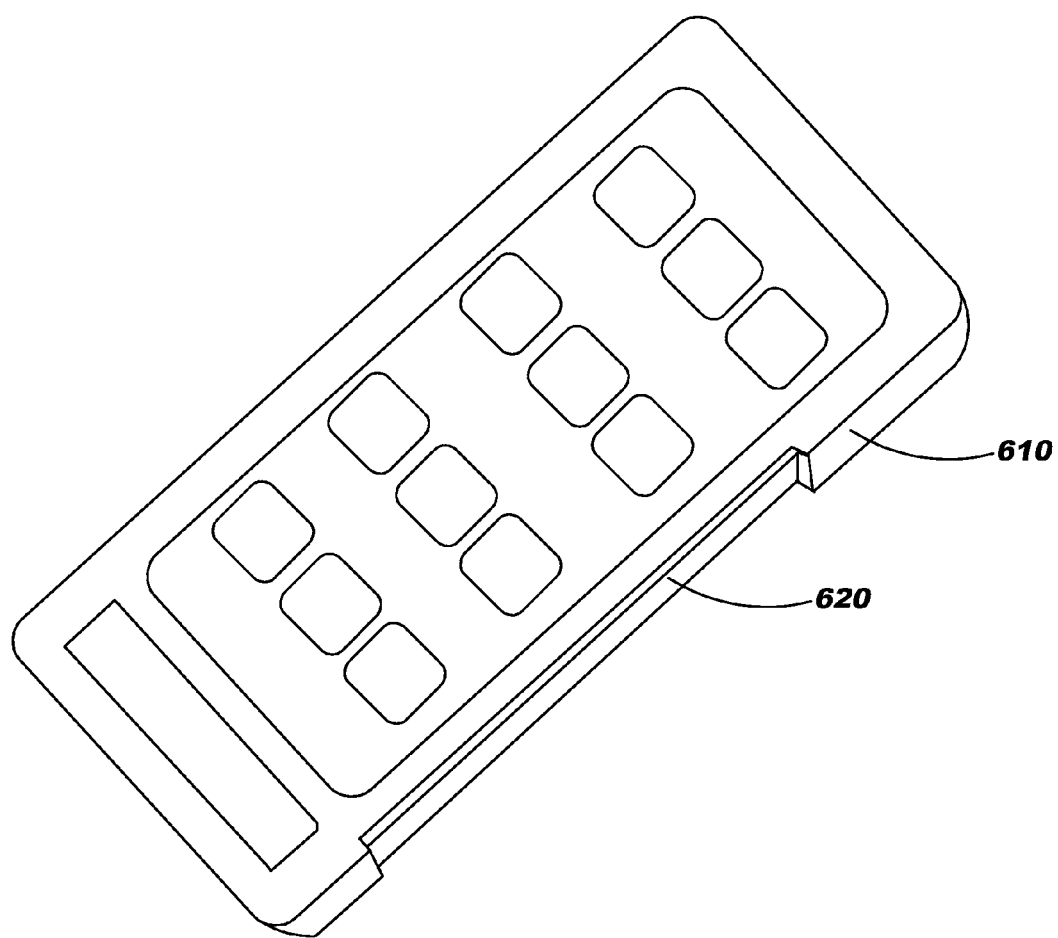
FIG. 6 depicts placement of a pressure-sensitive mechanism along the boundary of a mobile phone.

FIG. 6 depicts placement of a pressure-sensitive mechanism along the boundary of a mobile phone. See reference number 610. An embodiment of the present invention may use a transparent silicon membrane, for example, which wraps around the sides of the phone and which detects pressure points from the user's fingers. Many users apply a cover to their mobile phone to protect it from being damaged, and/or as a type of decorative feature, and so forth. Some of these covers include cut-out portions at various locations. An embodiment of the present invention may be adapted for detecting pressure from the user's fingers within one or more of the cut-out portions, and this is also illustrated in FIG. 6 at reference number 620.

Figure 7:
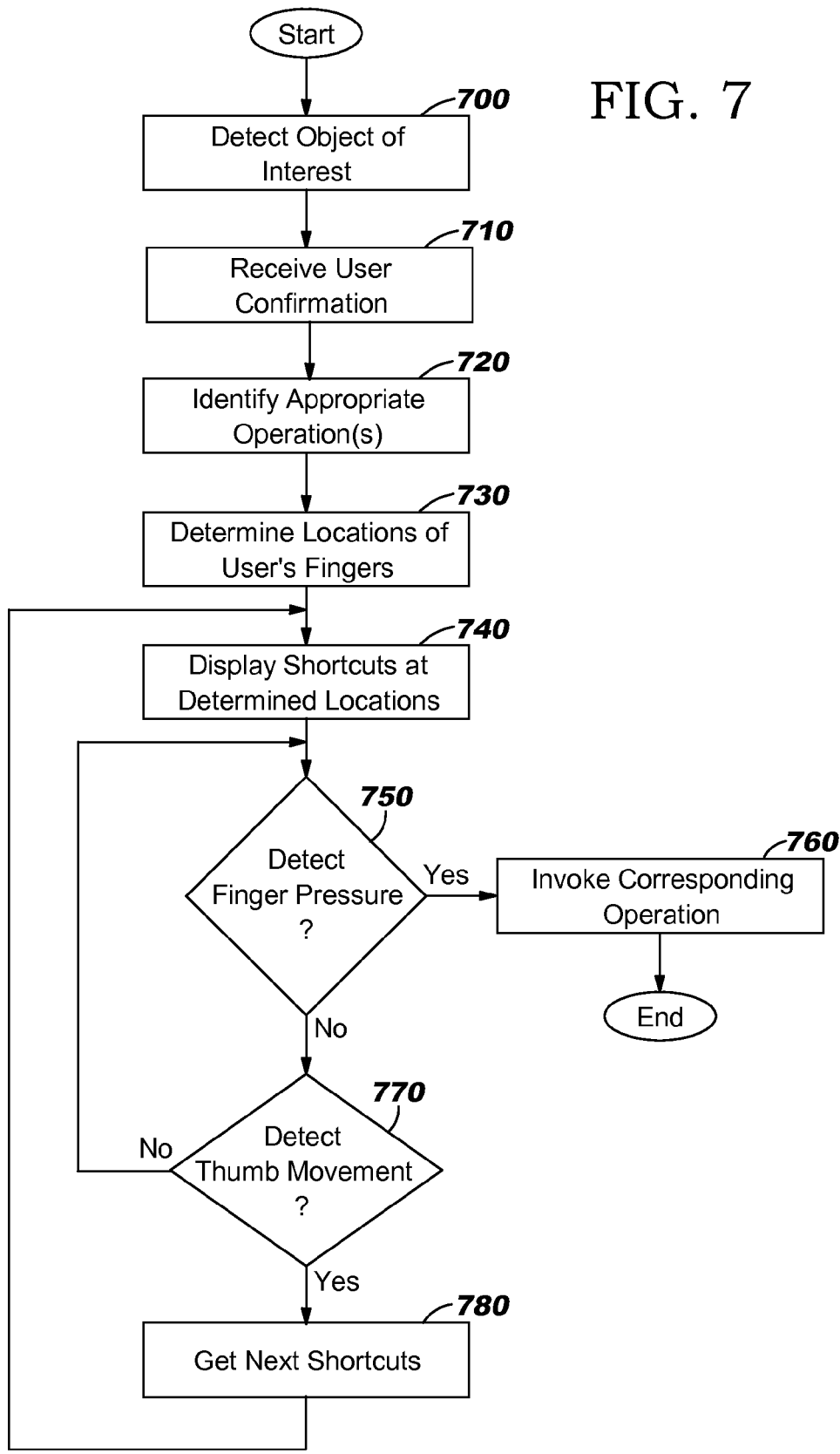
FIG. 7 provides a flowchart depicting logic which may be used when implementing an embodiment of the present invention.

FIG. 7 provides a flowchart depicting logic which may be used when implementing an embodiment of the present invention. As shown therein, an object of interest for the user is detected (Block 700). As noted earlier, this preferably comprises receiving an indication of the object from a gaze-point tracker. The gaze-point tracker may send coordinates of the displayed object, for example. As another approach, it may send a file name or other identifier of the displayed object. Note that in some cases, there may be only a single object displayed on the screen of the phone. In such cases, the gaze-point tracker may identify this single object.

Responsive to the user confirming that this is the object of interest (Block 710), one or more appropriate operations that are invocable for this object are identified (Block 720). As discussed earlier, the appropriate operations are preferably context-sensitive operations that may be determined (for example) according to the file type of the object. A mapping may be consulted, for example, that associates known file types with appropriate operations.

A preferred embodiment of the present invention dynamically adapts to changeable locations of the user's fingers. (Alternatively, an embodiment may be adapted for the user's fingers to be placed within proximity of predetermined locations.) Accordingly, the current location of each contacting finger is determined (Block 730) by detecting pressure along the side edge portion of the phone. As noted earlier, the pressure-sensitive mechanism is preferably provided in a symmetric manner on both side edge portions of the phone, and Block 730 therefore may determine the location of the contacting fingers on either the left side or the right side of the phone. As one alternative approach, the phone may be configured as to whether it will be used by a left-handed person or a right-handed person, and Block 730 may be adapted for determining the current location with regard to that particular side of the phone.

For each location of contact by a finger, a shortcut (i.e., iconic representation of an operation) is displayed in proximity of that location (Block 740). As discussed earlier, when the user contacts the phone with 4 fingers but more than 4 operations are available for selection, an embodiment of the present invention may initially display the first group of 4 shortcuts, or alternatively, may display a group of 4 shortcuts which are determined as the 4 most likely to be of interest to the user.

Note that it is not strictly necessary that the user contacts the phone with 4 fingers. If fewer than 4 fingers are determined to be in contact with the phone at Block 730, then Block 740 may be adapted for displaying fewer than 4 shortcuts—that is, some number "X" of shortcuts, where "X" is the number of contacting fingers—with each of these shortcuts displayed in proximity of a determined location of contact. In an optional aspect, an embodiment of the present invention may be adapted to accommodate momentary delays in contact by one or more of the user's fingers. For example, if one of the user's fingers moves away from the pressure-sensitive side edge portion of the phone, this lapse in contact may be ignored if it lasts less than some period of time (such as 5 seconds). In this case, a shortcut may be provided in proximity of the location of the finger which temporarily loses contact. The location for displaying such shortcut may be a remembered location where the finger most recently contacted the pressure-sensitive side edge portion. Or, the location may be determined responsive to the user re-touching the pressure-sensitive side edge portion within the determined period of time to re-establish a location for that finger. Optionally, the shortcut positioned for such finger may be displayed as faded, or lighter, in contrast to the other shortcuts to thereby indicate to the user that this finger is not currently detected as being in contact.

In situations where the number of contacting fingers is greater than the number of available shortcuts, an embodiment of the present invention may be adapted for displaying the available shortcuts in proximity of the locations of the first few of the user's fingers. As an alternative approach, ones of the available shortcuts may be duplicated, such that they are selectable using more than one of the user's fingers. As yet another approach, an embodiment of the present invention may be adapted to use a fixed number of locations for shortcuts, without regard to how many fingers are currently contacting the phone as determined by the pressure-sensitive mechanism. In this case, the number of shortcuts to be displayed at Block 740 is determined by the fixed number.

Block 750 tests whether pressure is detected from one of the user's fingers in a manner to indicate selection of a shortcut. As noted earlier, selection of a shortcut is preferably signaled by the user applying relatively more pressure with the finger in proximity of that shortcut. See FIG. 4, where this was illustrated at 410. When the test at Block 750 has a positive result, processing continues at Block 760, where the operation corresponding to the selected shortcut is invoked.

When the test at Block 750 has a negative result, on the other hand, processing continues at Block 770, which tests whether thumb movement of the user is detected. As noted earlier, thumb movement signals that the user wishes to scroll the set of shortcuts. See FIG. 5, where this was illustrated at 510. When the test at Block 770 has a positive result, processing continues at Block 780, where the next (or previous) group of shortcuts is obtained. Processing then continues at Block 740, where those shortcuts are displayed. FIG. 7 also indicates that a negative result for the test at Block 770 is followed by transferring control back to Block 750 to continue monitoring for the user's selection of a shortcut.

Although not shown in FIG. 7, processing may transfer to Block 700 to begin the process anew if the gaze-point tracker detects that the user has now focused his or her interest on a different displayed object.

As has been demonstrated, an embodiment of the present invention eliminates the need for the user to move their fingers to locations where iconic representations of invocable operations are displayed, thereby enabling the user to interact with the phone—while steadily holding it—through use of a single hand.

Figure 8:
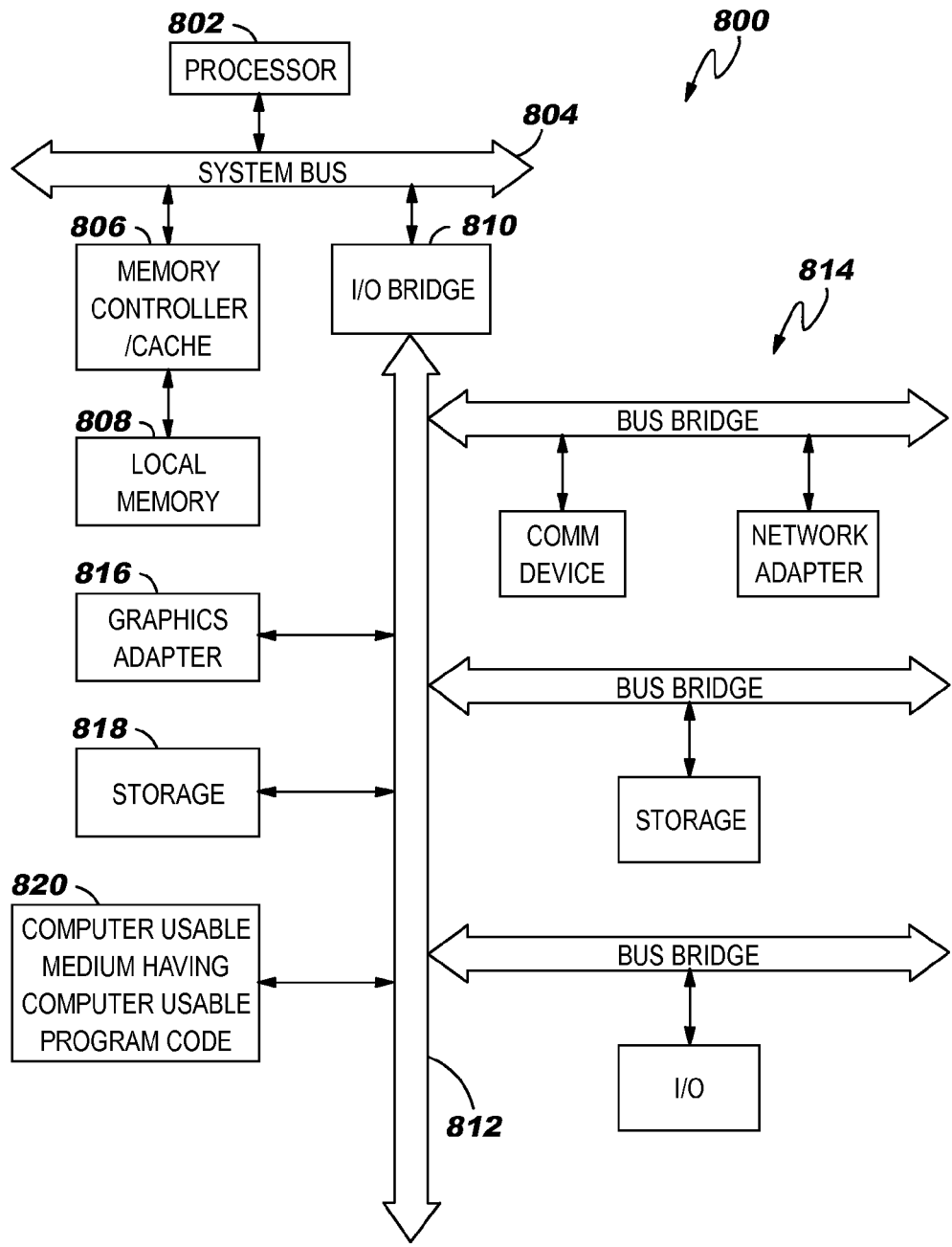
FIG. 8 depicts a block diagram of a data processing system in accordance with an embodiment of the present invention.

Referring now to FIG. 8, a block diagram of a data processing system is depicted in accordance with the present invention. Data processing system 800 may comprise a processor 802 connected to system bus 804. Also connected to system bus 804 is memory controller/cache 806, which provides an interface to local memory 808. An I/O bridge 810 is connected to the system bus 804 and provides an interface to an I/O bus 812. The I/O bus may be utilized to support one or more buses 814 and corresponding devices, such as bus bridges, input output devices ("I/O" devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 88, storage 818, and a computer usable storage medium 820 having computer usable program code embodied thereon. The computer usable program code may be executed to execute any aspect of the present invention, as have been described herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A mobile phone, comprising:
a pressure-sensitive detector situated along a side edge portion of the mobile phone;
a display surface;
a processor; and
instructions which are executable, using the processor, to perform functions comprising:
  detecting, for a user of the mobile phone, an object of interest from among at least one object displayed on the display surface;
  determining, for the object of interest, each of at least one operation invocable for the object;
  determining, by the detector, a current location of each contacting finger of the user, the contacting fingers being in contact with a first side edge portion of the phone; and
  for each contacting finger, positioning a graphical representation of a respective one of the determined at least one invocable operation on the display screen in proximity of the current location of the contacting finger, each positioned graphical representation being operable to invoke the respective invocable operation in response to the user indicating a selection of the positioned graphical representation.

2. The mobile phone according to claim 1, wherein the detecting comprises:
monitoring a gaze of the user as the user views the display surface; and
detecting, as the object of interest, the displayed object which is determined to be an object of the user's monitored gaze.

3. The mobile phone according to claim 1, wherein detecting the displayed object which is the object of the user's gaze further comprises detecting eye movements of the user.

4. The mobile phone according to claim 1, wherein the functions further comprise graphically highlighting, on the display surface, the detected object of interest.

5. The mobile phone according to claim 4, wherein the functions further comprise receiving, from the user, a confirmation that the highlighted object is the object of interest prior to the determining of the at least one invocable operation.

6. The mobile phone according to claim 5, wherein the confirmation comprises detecting a predetermined eye signal of the user.

7. The mobile phone according to claim 5, wherein the confirmation comprises detecting a predetermined selection signal provided by a thumb of the user.

8. The mobile phone according to claim 7, wherein:
the functions further comprise detecting, by the detector, a current location of the thumb of the user, the thumb being in contact with a second side edge portion of the phone; and
the selection signal comprises the user applying increased pressure with the thumb at the current location of the thumb, subsequent to the highlighting of the object of interest on the display screen.

9. The mobile phone according to claim 1, wherein:
determining the at least one invocable operation determines that at least 4 operations are invocable for the object;
determining the current location of each contacting finger determines the current location of 4 contacting fingers; and
the positioning positions, at each of the 4 contacting fingers, a graphical representation of respective ones of the invocable operations in a first set of 4 of the invocable operations.

10. The mobile phone according to claim 9, wherein:
the 4 invocable operations are ordered, for the positioning, in decreasing order of a predicted likelihood of interest to the user.

11. The mobile phone according to claim 9, wherein the functions further comprise providing a scrolling feature, responsive to determining that at least 5 operations are invocable for the object, to scroll from the first set of 4 of the invocable operations to at least one subsequent set of the invocable operations, the at least one subsequent set containing at least one invocable operation that is not present in the first set of 4 of the invocable operations.

12. The mobile phone according to claim 11, wherein providing the scrolling feature further comprises:
monitoring, by the detector, a current location of the thumb of the user, the thumb being in contact with a second side edge portion of the phone; and
responsive to determining that the current location of the thumb moves in a vertical direction along the second side edge portion, replacing the positioned graphical representation of the invocable operations in the first set with respective ones of the invocable operations in the subsequent set.

13. The mobile phone according to claim 12, wherein the detector detects the movement in the vertical direction responsive to a location of pressure from the thumb moving along the second side edge portion for at least a predetermined distance.

14. The mobile phone according to claim 1, wherein the indicating a selection comprises the user applying relatively more pressure to the pressure-sensitive detector at a particular location on the first side edge portion, the particular location corresponding to the position of the graphical representation for which the selection is indicated.

15. A method of interacting with a mobile phone using a single hand, the mobile phone comprising a display surface, a processor, a gaze detector that monitors a gaze of a user viewing the display surface, and a pressure-sensitive detector situated along a side edge portion of the mobile phone, comprising:

receiving, by the processor from the gaze detector, an identification of an object of interest from among at least one object displayed on the display surface;

determining, by the processor for the object of interest, each of at least one operation invocable for the object;

receiving, by the processor from the detector, an identification of a current location of each contacting finger of the user, the contacting fingers being in contact with a first side edge portion of the phone; and for each contacting finger, positioning a graphical representation of a respective one of the determined at least one invocable operation on the display screen, by the processor, in proximity of the current location of the contacting finger, each positioned graphical representation being operable to invoke the respective invocable operation in response to the user indicating a selection of the positioned graphical representation.

16. The method according to claim 15, wherein the gaze detector detects the object of interest by detecting eye movements of the user.

17. The method according to claim 15, wherein the gaze detector detects the object of interest by detecting that the user blinks when gazing at the object of interest.

18. A computer program product for interacting with a mobile phone using a single hand, the mobile phone comprising a display surface, a processor, a gaze detector that monitors a gaze of a user viewing the display surface, and a pressure-sensitive detector situated along a side edge portion of the mobile phone, the computer program product comprising:

a non-transitory computer-readable storage medium having computer readable program code embodied therein, the computer-readable program code configured for:

receiving, by the processor from the gaze detector, an identification of an object of interest from among at least one object displayed on the display surface;

determining, by the processor for the object of interest, each of at least one operation invocable for the object;

receiving, by the processor from the detector, an identification of a current location of each contacting finger of the user, the contacting fingers being in contact with a first side edge portion of the phone; and for each contacting finger, positioning a graphical representation of a respective one of the determined at least one invocable operation on the display screen, by the processor, in proximity of the current location of the contacting finger, each positioned graphical representation being operable to invoke the respective invocable operation in response to the user indicating a selection of the positioned graphical representation.

* * * * *